(12) United States Patent
Reparaz

(10) Patent No.: US 6,934,351 B2
(45) Date of Patent: Aug. 23, 2005

(54) BOILING WATER REACTOR FUEL ASSEMBLY

(75) Inventor: Adolfo Reparaz, Richland, WA (US)

(73) Assignee: Framatome ANP Inc., Lynchburg, VA (US)

( * ) Notice: Subject to any disclaimer, the term of this patent is extended or adjusted under 35 U.S.C. 154(b) by 0 days.

(21) Appl. No.: 10/313,799

(22) Filed: Dec. 6, 2002

(65) Prior Publication Data

US 2004/0109524 A1 Jun. 10, 2004

(51) Int. Cl.⁷ .................................................. G21C 3/32
(52) U.S. Cl. ....................... 376/434; 376/446; 376/451; 376/453; 376/454
(58) Field of Search ................................. 376/446, 451, 376/453, 454, 434

(56) References Cited

U.S. PATENT DOCUMENTS

| | | | | |
|---|---|---|---|---|
| 3,389,056 A | * | 6/1968 | Frisch | 176/78 |
| 3,697,376 A | * | 10/1972 | Mefford et al. | 376/446 |
| 3,802,996 A | * | 4/1974 | Jones | 176/78 |
| 3,856,623 A | * | 12/1974 | Kamo | 176/78 |
| 4,348,353 A | * | 9/1982 | Christiansen et al. | 376/364 |
| 4,560,532 A | * | 12/1985 | Barry et al. | 376/434 |
| 4,663,118 A | * | 5/1987 | Nelson | 376/445 |
| 4,702,882 A | * | 10/1987 | Stucker | 376/446 |
| 4,749,544 A | * | 6/1988 | Crowther et al. | 376/443 |
| 4,873,051 A | * | 10/1989 | Duncan et al. | 376/438 |
| 4,889,684 A | * | 12/1989 | Johansson | 376/444 |
| 5,141,701 A | * | 8/1992 | Bryan | 376/364 |
| RE34,246 E | * | 5/1993 | Crowther et al. | 376/443 |
| 5,627,865 A | * | 5/1997 | Williamson et al. | 376/434 |
| 5,727,040 A | * | 3/1998 | Lippert et al. | 376/443 |
| 5,787,143 A | * | 7/1998 | Reiss et al. | 376/446 |

* cited by examiner

*Primary Examiner*—Jack Keith
(74) *Attorney, Agent, or Firm*—Kenyon & Kenyon

(57) ABSTRACT

An fuel assembly with a connection between a fuel channel and a lower tie plate to allow the fuel channel to be removed from an internal fuel rod assembly without the necessity of moving interior fuel rods during removal of the fuel channel.

5 Claims, 11 Drawing Sheets

BOILING WATER REACTOR FUEL ASSEMBLY

FIELD OF THE INVENTION

The present invention relates to nuclear fuel assemblies. More specifically, the present invention provides a configuration for a nuclear fuel assembly that uses a removable fuel assembly channel as a primary load carrying member during assembly movement. The present invention also allows the fuel assembly to be channeled and de-channeled for fuel inspections and/or repairs wherein the fuel channel is lifted from the assembly.

BACKGROUND INFORMATION

Boiling water reactor fuel assemblies are commonly used in nuclear reactors throughout the world. During normal reactor operations, the reactor must be stopped to provide new fuel. Generally, a boiling water reactor is operated for a period between 12 and 36 months before the reactor must be shut down. After shutdown, termed an "outage", approximately ⅓ of the fuel assemblies which comprise the core of the reactor are replaced with new fuel. The new fuel is generally placed in locations in the reactor according to the specific characteristics of the reactor and the fuel assemblies present therein. New fuel is often first placed in the outside areas of the reactor and then moved towards the center of the reactor during each progressive outage occurring thereafter.

Many progressive moves of fuel assemblies are made during the lifetime of the reactor core to allow for efficient operation of the reactor. Over time, the fuel assemblies must also be lifted and removed from the reactor to be inspected for wear and mechanical damage. As is evident, handling of fuel assemblies is critical to safe and continued operation of a nuclear facility.

In current boiling water reactor fuel assemblies each fuel rod rests on a lower tie plate. The weight of all the fuel rods, lower tie plate and other structural components is transferred to internal tie rods when a fuel assembly is lifted. The internal tie rods prevent overstress of the relatively fragile fuel rods. Other configurations for boiling water reactor fuel assemblies use an internal water channel to carry the weight of the assembly.

Other configurations of fuel assemblies use the outside fuel channel to aid in lifting the assembly. These configurations are known as "bundle in basket" designs. In these assemblies, inspection of the interior parts, such as the fuel rods, is performed by holding the outside fuel channel in a stationary position, disconnecting the fuel channel from the inner fuel rods, and lifting the interior fuel rods out of the fuel channel for inspection. These designs require that the heavy part of the fuel assembly, namely the fuel rods and spacer grids, be lifted to produce a separation between the fuel assembly outside fuel channel and the fuel assembly internals. There are many drawbacks to this type of configuration. The fuel rods are lifted to facilitate the inspection, thereby increasing chances of a lifting accident involving the fissile material. Since the fissile material must be lifted with this configuration, the overhead crane systems or other mechanisms used to perform the lift must undergo stringent safety checks and have specific configurations to enable the lift to occur. The lift of the heavy internal structure sometimes results in damage to the relatively fragile spacer grid configuration along the sides of the fuel assembly. This damage occurs when the fuel assembly is "re-channeled" or reinserted into the outside fuel channel. The lowering of the fuel assembly into the relatively narrow fuel channel often produces binding or impact between the spacer grids and fuel channel. If damage occurs, the damaged spacer grids must be inspected and/or evaluated to determine the extent of the damage and applicability of future use. The lowering of the fissile material into the fuel channel is accomplished at slow speeds, in an attempt to avoid damage to the fuel spacer grid. This slow speed increases fuel reloading time and increases economic cost for the nuclear facility.

There is a need to limit handling of heavy loads containing fissile material to increase safety in a nuclear facility.

The is also a need to limit expensive lifting and/or rigging mechanisms and their use in conjunction with nuclear fuel assemblies.

There is a further need to limit damage to fuel assemblies when an assembly is re-channeled.

There is a still further need to speed refueling of a nuclear reactor to increase economic profitability.

SUMMARY

It is an object of the present invention to provide a configuration for a nuclear fuel assembly to limit the lifting of heavy loads containing fissile material to increase safety in a nuclear facility.

It is an object of the present invention to limit expensive lifting and/or rigging mechanisms and their use in conjunction with nuclear fuel assemblies.

It is a further object of the present invention to limit damage to fuel assemblies when an assembly is re-channeled.

It is a still further object of the present invention to speed refueling of a nuclear reactor to increase economic profitability for a nuclear facility.

These and other objects of the present invention will be achieved as disclosed and illustrated. A nuclear fuel assembly for a boiling water comprising a plurality of fuel elements, a plurality of cladding elements configured around the plurality of fuel elements, each cladding element having a longitudinal axis, wherein the cladding elements have an upper end cap and a lower end thereby encapsulating the fuel elements, wherein each of the cladding elements is further configured along a common axial direction parallel to the individual longitudinal axes, a plurality of spacer grids positioned between the upper end cap and the lower end of the cladding elements, the plurality of spacer grids configured to receive the plurality of cladding elements and to minimize movement of the plurality of cladding elements, a fuel channel with an upper and a lower end and defining an interior volume, the channel configured with a plurality of holes at the lower end, the fuel channel further configured to house the plurality of cladding elements and the plurality of spacer grids in the volume, a lower tie plate configured to receive the fuel channel lower end and to have a plurality of holes, the plurality of holes of the fuel channel matching with the plurality of holes of the lower tie plate in a single orientation when the fuel channel is received, the lower tie plate further configured with a bolt arrangement in the aligned plurality of holes of the lower tie plate and the fuel channel to connect the fuel channel with the lower tie plate, the lower tie plate configured to support the plurality of cladding elements at the lower end and transfer a weight of the lower tie plate and the plurality of cladding elements to the fuel channel through the bolt arrangement, the bolt arrangement configured to be positioned in an engaged configuration to allow weight transfer and a disengaged configuration wherein the fuel channel may be removed from the fuel assembly without requiring lifting of the plurality of cladding elements, an upper end defining a volume and configured with a bail arranged to transfer a weight of the fuel nuclear fuel assembly to a lifting device, the upper end arranged at the upper end of the fuel channel and connected to the upper end of the fuel channel through buttons, the buttons configured to engage and disengage the fuel channel from the upper end to allow the fuel channel to be removed from the fuel assembly when the bolt arrangement is in the disengaged configuration, a streamlined spacer configured in the volume of the upper end, the streamlined spacer configured to retain the plurality of cladding elements and position the upper end caps of the plurality of cladding elements, and a nozzle located below the lower tie plate configured to receive and distribute a coolant moderator throughout the fuel assembly.

The invention provides a second embodiment. The second embodiment provides a nuclear fuel assembly for a boiling water reactor comprising a plurality of fuel elements, a plurality of cladding elements configured around the plurality of fuel elements, each cladding element having a longitudinal axis, wherein the cladding elements have an upper end cap and a lower end thereby encapsulating the fuel elements, wherein each of the cladding elements is further configured along a common axial direction parallel to the individual longitudinal axes, a plurality of spacer grids positioned between the upper end cap and the lower end of the cladding elements, the plurality of spacer grids configured to receive the plurality of cladding elements and to minimize movement of the plurality of cladding elements, a fuel channel with an upper and a lower end and defining an interior volume, the fuel channel further configured to house the plurality of cladding elements and the plurality of spacer grids in the interior volume, a lower tie plate configured to receive the fuel channel lower end, the lower tie plate configured to support the plurality of cladding elements at the lower end and transfer the weight of the lower tie plate and the plurality of cladding elements to the fuel channel through a tab configuration, the tab configuration configured to be positioned in an engaged configuration to allow load transfer from the lower tie plate to the fuel channel and a disengaged configuration, an upper end defining a volume and configured with a bail arranged to transfer a weight of the nuclear fuel assembly to a lifting device, the upper end arranged at the upper end of the fuel channel and connected to the upper end of the fuel channel through buttons, the buttons configured to release the fuel channel from the upper end to allow the fuel channel to be removed from the fuel assembly when the tab arrangement is in the disengaged configuration, the fuel channel configured to be removed from the fuel assembly without requiring lifting of the plurality of cladding elements, a streamlined spacer configured in the defined volume to retain the plurality of cladding elements and position the upper end caps of the plurality of cladding elements, and a nozzle configured below the lower tie plate, configured to receive and distribute a coolant moderator throughout the fuel assembly.

DETAILED DESCRIPTION

Figure 1:
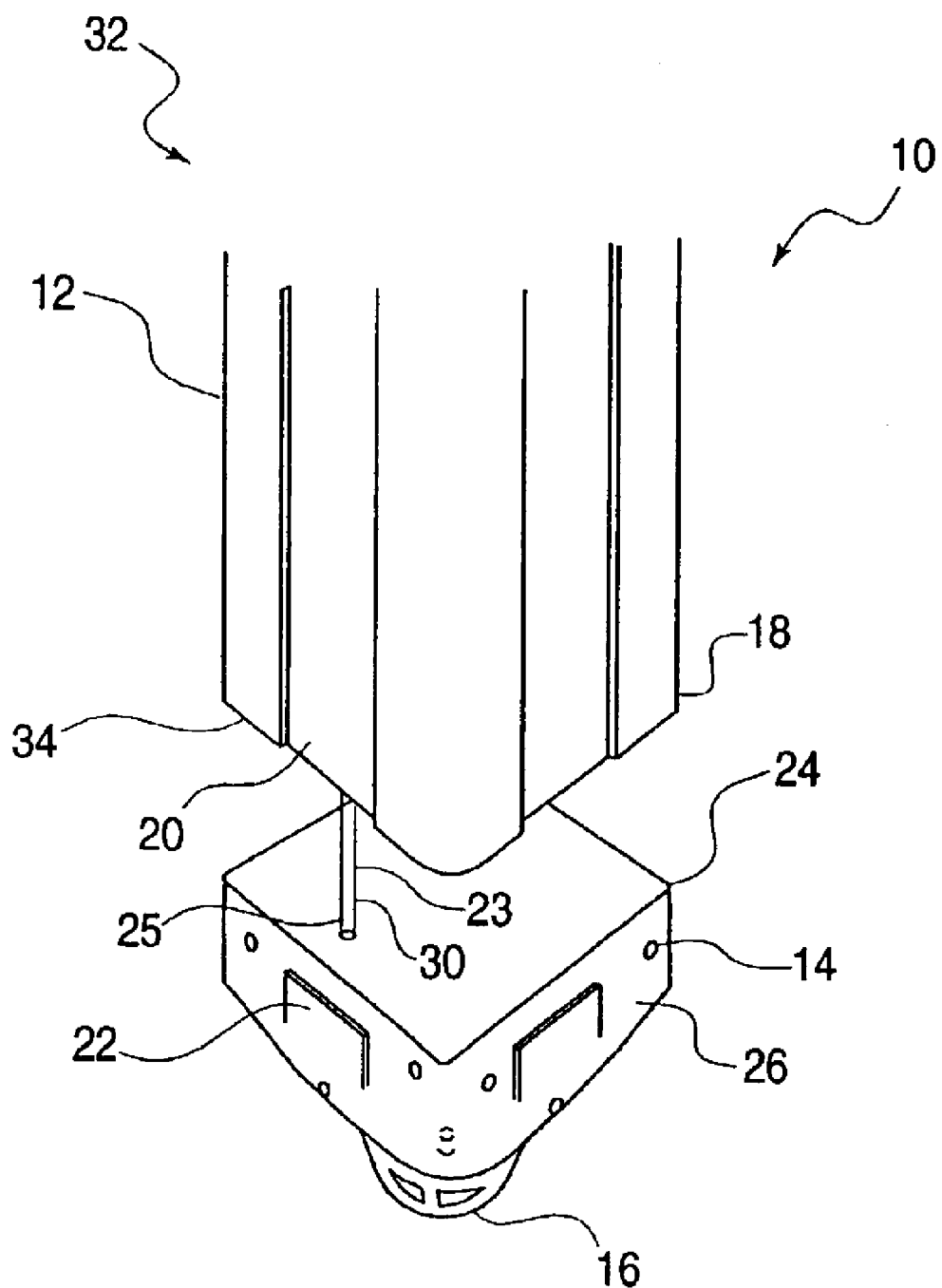
FIG. 1 is a perspective view of a fuel assembly lower end with a removable tab/channel configuration in a disengaged position.

A fuel assembly lower end 10 is illustrated in FIG. 1. Through the first embodiment, an arrangement to transfer fuel assembly 32 weight through the fuel channel 12 without the need for lifting the fuel rods during channeling is illustrated. The engagement and disengagement of the fuel channel 12 may be performed remotely while the fuel assembly 32 is under water. The fuel assembly lower end 10 is comprised of a fuel channel 12 which is configured to attach and be received by a lower tie plate 14. Nozzle 16 of the fuel assembly lower end 10 is positioned to provide for acceptance and movement of a coolant moderator, such as water, through the fuel assembly 32. Corners 18 of the fuel channel 12 are positioned over corresponding corners 24 of the lower tie plate 14 such that the respective corners 18, 24 align. The fuel channel 12 may be further configured with an indentation 20 on a side of the fuel channel 12. The indentation 20 corresponds to a tab 22 configured on an exterior portion 26 of the lower tie plate 14. A plurality of indentations 20 may be situated on the fuel channel 12 sides such that multiple connections between indentations 20 and tabs 22 described later may occur. The tabs 22 located on the lower tie plate 14 are configured such that the indentations 20 slide into the lower tie plate indentations 20 mechanically locking the fuel channel 12 to the lower tie plate 14.

Fuel rods 30 which are positioned in an interior volume defined by the fuel channel 12 house fissile fuel used for the nuclear reaction of the reactor. The fuel rods 30 may contain, for example, fuel elements, in a metal cladding element made of material, such as Zircaloy, for protection of the fuel elements. A plurality of fuel elements and cladding elements may be used. The fuel elements may be cylindrical shaped enriched uranium oxide units which may be stacked in a manner to produce a rod shaped structure. The rod shaped structure may, in turn, form the interior portion of a fuel rod 30. Although the overall fuel assembly 32 is illustrated as a rectangular arrangement, other configurations are possible, including round, trapezoidal, and octagonal as examples.

The fuel rods 30 are held in position by spacer grids which limit potential side to side destructive movement during operating conditions for example. The spacer grids also channel coolant flow through the fuel assembly 32, thereby providing for heat transfer from the fuel rods 30 during the fission process. A plurality of spacer grids may be used to hold the plurality of cladding elements 25 in the fuel rods 30 in position along the length of the fuel assembly 32.

The plurality of cladding elements 25 may be configured around the fuel elements 23. The plurality of cladding elements may have a longitudinal axis, an upper end cap and a lower end encapsulating the fuel elements 23. Each cladding element 25 may be configured along a common axial direction parallel to the individual longitudinal axes of the cladding elements 25 (i.e. the cladding elements 25 may be rod shaped with individual rods positioned next to one another.)

The configuration illustrated allows for support of the fuel rod 30 lower ends by the lower tie plate 14. The connection established between the lower tie plate 14 and the fuel channel 12 enables transfer of weight from the lower tie plate 14 to the fuel channel 12 which transfers up the body of the assembly 32. In this manner, all or part of the weight of a fuel assembly 32 may be carried by the fuel channel 12 when moved by a lifting device, thereby limiting or eliminating use of tie rods or a water channel as structural elements in previous configurations.

Figure 2:
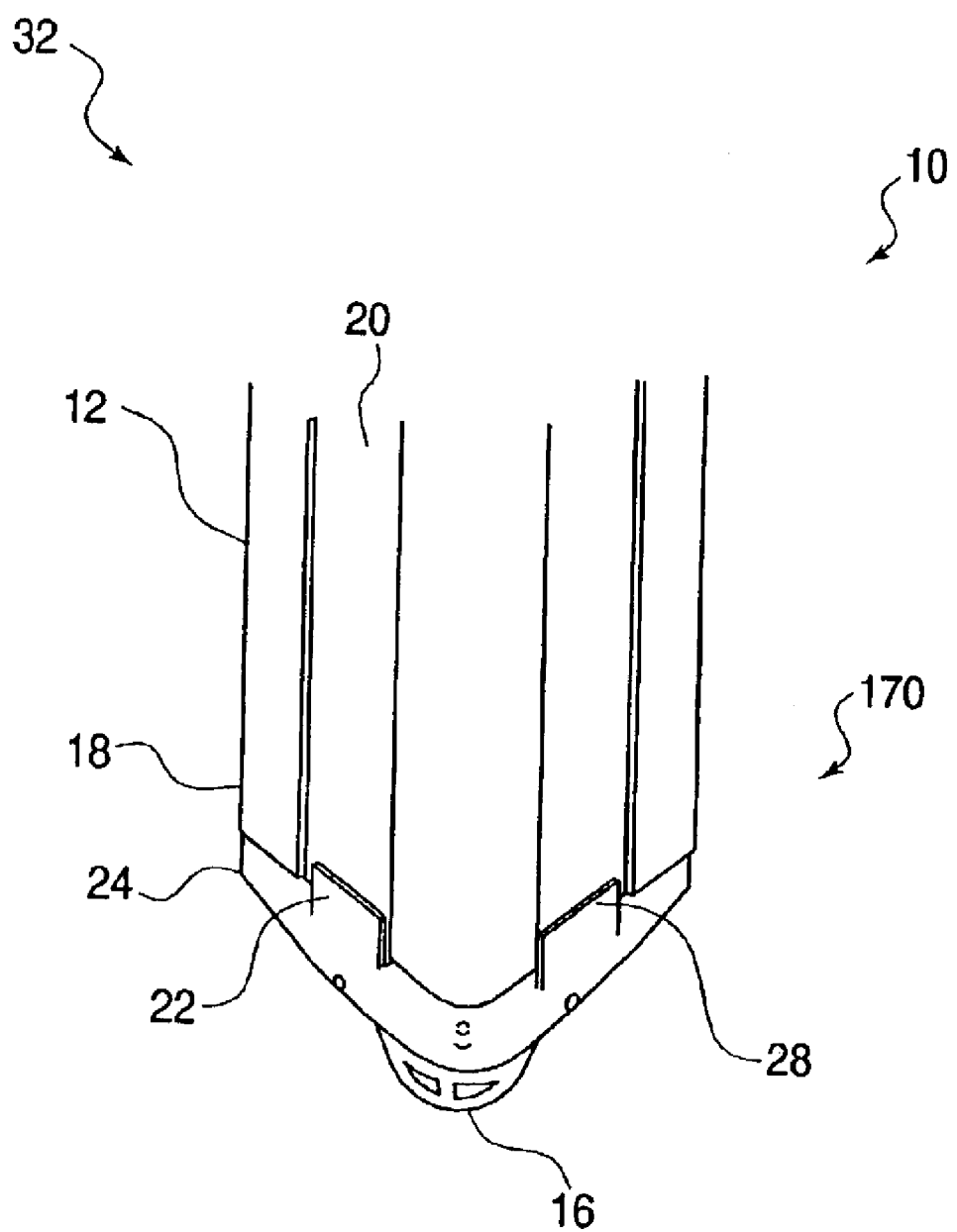
FIG. 2 is a perspective view of a fuel assembly lower end with a removable tab/channel configuration in an engaged position.

In FIG. 2, an example embodiment of a tab configuration 170 is illustrated. In the embodiment illustrated a tab/channel connection 28 is established between a respective tab 22 and indentation 20 on the fuel channel 12, allowing weight transfer to the fuel channel 12 during fuel assembly 32 movement. The tab/channel connection 28 may be configured to provide sufficient weight handling capacity for movement of the entire fuel assembly 32. The tab/channel connection 28 may provide for a lifting capacity, for example, with a factor of safety of 10 to 1 to the ultimate strength of the tab/channel connection material. As an alternative embodiment, the corners 18 of the fuel channel 12 may be configured to carry a portion of the load of the fuel assembly 32 bridged by the indentation 20.

The tab/channel connection 28 of the fuel assembly 32 may be configured such that the connection 28 is resilient allowing multiple engagements and disengagements of the lower tie plate 14 and the fuel channel 12. The tab/channel connection 28 may allow for load transfer capability between the fuel channel 20 and the lower tie plate 14 under differing loading combinations, including, but not limited to, seismic events, thermal expansion and contraction, heavy load lift, LOCA, and heavy load drop. The tab/channel connection 28 may eliminate the need for seal springs wherein the abutment of the fuel channel 20 and the lower tie plate 14 may be water-tight.

In an engaged position, the tab/channel connection 28 may be configured to provide continuous flow of coolant over the connection 28 with little or no disturbance to fluid flowing past the fuel assembly 32. As illustrated, the tab/channel connection 28 provides a configuration wherein the tab 22 is positioned in the indentation 20 of the fuel channel 20, thereby minimizing flow disturbance. Other configurations such as a tab position inside the fuel channel 20 are possible, therefore the example embodiment illustrated is but one possible configuration.

The tab/channel connection 28 may be engaged through movement of the fuel channel 12 down over the top and exterior of the internal fuel rods 30 until the channel 12 lower end 34 contacts the tab 22 providing a friction fit. Additional force may be exerted on the channel 12 allowing a tight fit, establishing the tab/channel connection 28. Disengagement of the tab/channel connection 28 may occur through deflection of the tab 22 or indentation 20 of the fuel channel 12. Deflection of either of these elements may loosen the connection 28 allowing the channel 12 to be lifted off the interior fuel rods 30, thereby minimizing load lifts with the fissile material.

The fuel channel 12 and the lower tie plate 14 may be configured from a material with a low neutron capture cross-section, thereby establishing a capability to allow fission reaction between fuel assemblies 32 in the reactor. As an example, Inconel 750 or other material may be used in the construction of these members.

Figure 3:
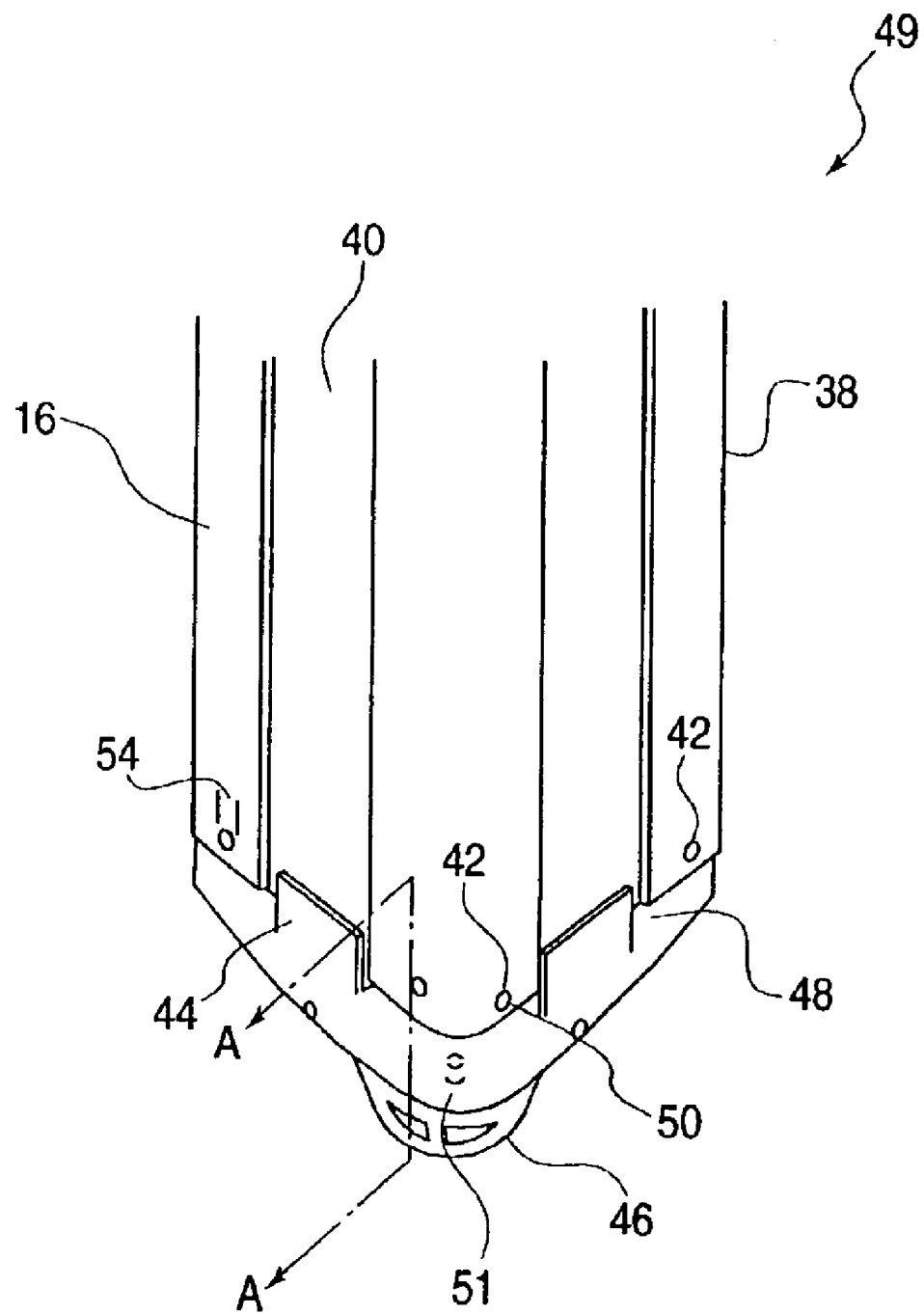
FIG. 3 is a perspective view of a fuel assembly with a latching bolt attachment.
Figure 4:
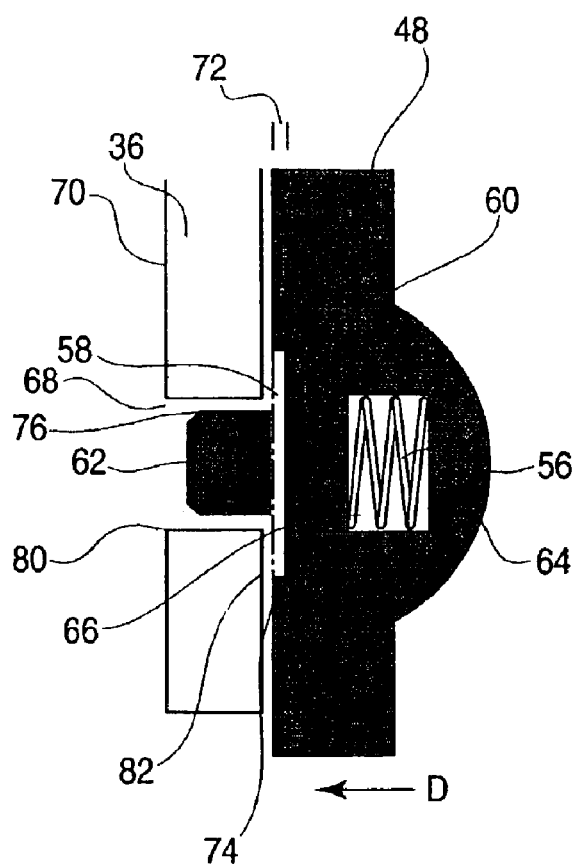
FIG. 4 is a cross-sectional view of the latching bolt attachment of FIG. 3.

A second embodiment of a tab configuration 170 is illustrated in FIGS. 3 and 4 which comprise a lower tie plate 48 and fuel channel 36 connection. The second embodiment provides a configuration by which the fuel channel 36 may be connected to the tie plate 48 to provide both a load transfer configuration for lifting of the assembly 49 and a water-tight connection between the tie plate 48 and the fuel channel 36. In the second embodiment, a latching bolt attachment 50 is formed between the tie plate 48 and the fuel channel 36. The latching bolt attachment 50 allows for establishment of a connection between the tie plate 48 and the fuel channel 36 for load transfer during assembly lifting to maintain the fuel channel 36 in relative position during reactor operation. The latching bolt attachment 50 may be quickly disengaged, allowing the fuel channel 36 to be slipped over and away from the interior elements (i.e. fuel rods and spacer grids) of the fuel assembly 49 without need for fissile material movement. Disengagement for the fuel assembly 49 lower end of the fuel channel 36 to the lower tie plate 48 may occur by depressing a bolt head 62 causing a spring 56 to compress. The fuel channel 36 at the lower end may then be disengaged when the bolt head 62 clears the interior edge 82 of the fuel channel 36. The latching bolt attachment 50 is engaged by placing the fuel channel 36 over the tie plate 48 to align the thick corners 38 of the fuel channel 36 with the corners 51 of the lower tie plate 48. A tab 44 may be inserted to capture the thin panel 40 of the fuel channel 36, similar to the first embodiment previously discussed. Latching bolts 42 may be arranged to provide the connection between the fuel channel 36 and the lower tie plate 48. In the example embodiment illustrated, two latching bolts 42 may be used per individual corner 52. As illustrated, 8 latching bolts 42 may be configured around the periphery of the fuel channel 36, however more or less bolts 42 may be used to establish the connection. The diameter 54 of the latching bolts 42 may be varied according to bolt material shear and tensile properties, fuel channel shear and tensile properties, fuel channel thickness and anticipated loading conditions.

A cross-sectional view of the latching bolt configuration of FIG. 3 is illustrated in FIG. 4. A spring 56 is positioned in an interior arrangement of the tie plate 48 allowing an outward bias in the direction D illustrated. The spring 56 contacts the tie plate 48 on a first end 64. At a second end 66, the spring 56 contacts a bolt backing 60. The bolt backing 60 may be slipped into the hole of the washer 58, the washer 58 being oversized in relation to a hole diameter 68 provided in the fuel channel 36. The bolt backing 60 may be configured such that the backing 60 prevents the spring 56 from sliding out of the tie plate 48. In the configuration presented, the washer 58 maybe configured from a material which is relatively softer than the tie plate 48 and the fuel channel 36. The washer 58 may be manufactured from low carbon austenitic stainless steel, such as AISI 304L or similar material, as an example.

Figure 5:
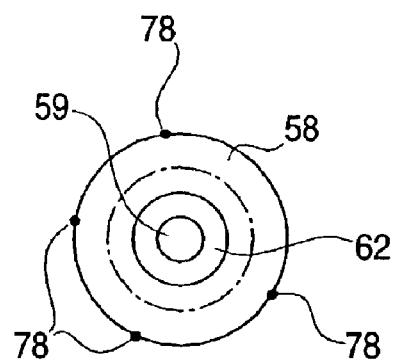
FIG. 5 is a cross-sectional view of the latching bolt attachment of FIG. 4.

The washer 58 prevents the spring 56 from expanding beyond a predefined limit which would potentially cause flow restriction concerns from bolt head 62 protrusion exterior to the outer surface 70 of the fuel channel 36. The washer 58, in providing this restriction, will not damage the fuel channel 36 or tie plate 48 due to the relatively soft material used in washer 58 construction. The tie plate 48 may be counter-sunk a distance 72 such that a smooth transition plane 74 is formed at the junction of the washer 58 and the lower tie plate 48. The bolt head 62 protrudes, when in an extended prosition, from the exterior surface of the washer 58 such that a bearing surface 76 is established between the fuel channel 36 and the bolt head 62. The bearing surface 76 provides the contact point between the lower tie plate 48 and the fuel channel 36 to transfer load. Referring to FIGS. 4 and 5, the washer 58 may be welded to the tie plate 48 to provide additional restraining force at weld points 78. Although illustrated as weld points 78, other configurations are possible including a weld line around the circumference of the washer-tie plate interconnection. The weld points 78 may be qualified for nuclear application, thereby reducing weld stresses potentially arising from fabrication. The weld points 78 may further be magnetic particle inspected, visually inspected, and/or dye penetrant inspected to verify quality construction. Washer 58 materials may be chosen to provide reduced neutron capture cross-section to promote fuel assembly 49 fission capability. Washer material may additionally be provided such that they are corrosion resistant. Bolt head 62 construction and hole 68 configuration may be closely matched to minimize "play" in the tie plate/fuel channel connection. As illustrated, the hole 68 and the bolt head 62 may be configured in a circular arrangement, thereby reducing potential material stresses arising from sharp corners. Other configurations are possible including octagon, square or other complex geometric shape. If a configuration using an angled configuration is used, local areas 80 of the fuel channel 36 may be thickened or stiffened to prevent crack propagation throughout the fuel channel 36.

The spring 56 may be configured of non-corrosive material, as an example, which provides the bias force in the D direction. As such, the spring 56 constant may be selected such that under loading conditions for the fuel assembly 49, the spring 56 will not deflect sufficiently to allow slippage of the bolt head 62 from the hole 68. Additionally, the spring 56 may be configured to allow depression with relative ease eliminating potential concerns excessive force used on the fuel assembly 49. The configuration may allow engagement and disengagement in an underwater environment. Materials which may be used for construction of the spring 56 include, for example Inconel 750 or other high strength compatible materials.

Referring to FIG. 5, the washer 58 and bolt head 62 configuration is illustrated in a cross-sectional view. As illustrated in FIGS. 4 and 5, the configuration presented may be retrofitted into existing fuel assembly configurations, or may be established in a new fuel assembly 49. The configuration provides retention capabilities, while limiting potential concerns with loose parts and foreign materials entering the coolant of the reactor. In the example embodiment illustrated, the bolt 62, washer 58 and spring 56 will only require a cavity approximately 0.7 inches deep. To accommodate the latching bolt attachment 50, the thickness of the lower tie plate 48 may be locally increased towards the inside to provide the required depth. A weep hole 59 connecting the inside of the cavity to the water flow path in the inside of the lower tie plate 48 may be provided to avoid stagnant water from forming inside the cavity, possibly leading to accelerated crevice corrosion of the bolt 62 and/or spring 56 and possibly interfering with the free movement of the latching bolt 62. The latching bolts 62 and holes 68 in the fuel channel 36 may be offset to provide a single engagement position for locking all of the bolts relative to the holes 68, thus providing a single matching position between lower tie plate 48 and fuel channel 36.

Figure 6:
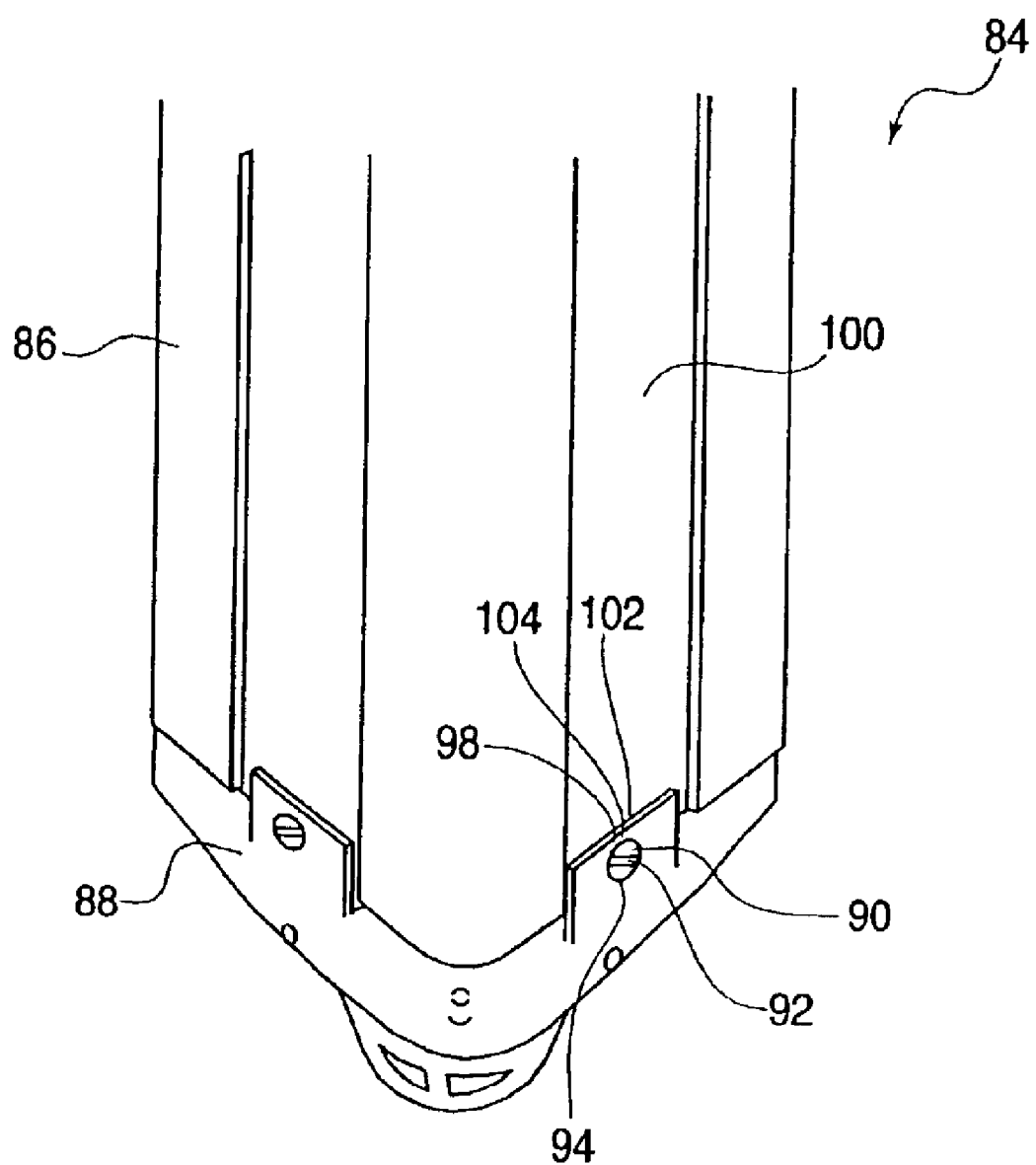
FIG. 6 is a perspective view of a fuel assembly with a connecting bolt arrangement in an assembled position.
Figure 7:
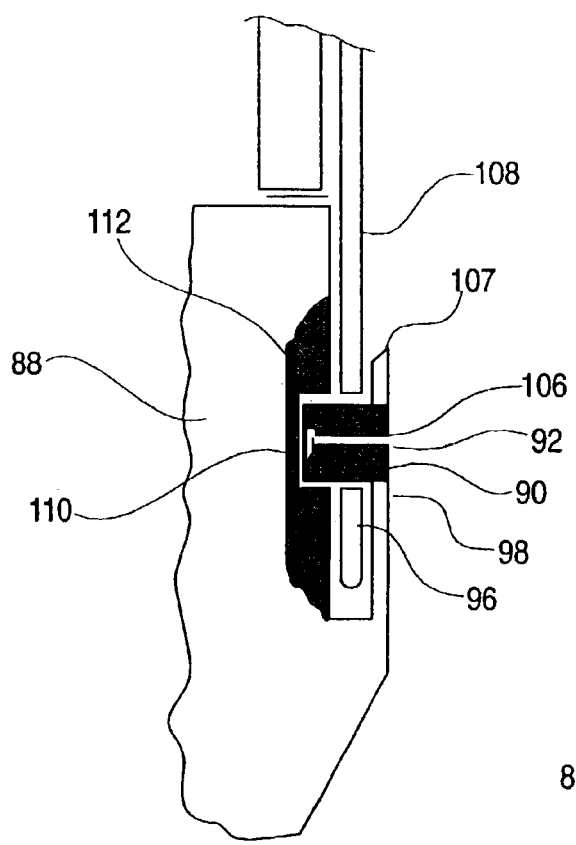
FIG. 7 is a cross-sectional view of the connecting bolt arrangement of FIG. 6.

Referring to FIGS. 6 and 7, a third embodiment of a fuel assembly lower end connection is illustrated. The third embodiment provides a connection between a lower tie plate 88 and a fuel channel 86 to allow the fuel channel 86 to carry the load of the fuel assembly when the fuel assembly is lifted. The connecting bolt arrangement 84 provides an alternative configuration to establish a connection between a fuel channel 86 and a lower tie plate 88 compared to the previously discussed embodiments. The arrangement 84 may be configured to withstand various loading conditions including, but not limited to seismic loads, LOCA, heavy load lift, load drop impact, and thermal deflection. The connecting bolt arrangement 84 is provided with a bolt 90 with a head 104. The bolt 90 is positioned in a hole 92 in a tab 94 of the lower tie plate 88. The tab 94 is configured to allow insertion of the fuel channel 86 into a gap 96 provided by the separation of the tab 94 from the remainder of the body of the lower tie plate 88. The gap 96 may be configured to not exceed the wall thickness of the lower tie plate 88. The head 104 of the bolt 90 may be configured to be flush with the exterior 98 of the tab, allowing for unimpeded fluid flow on the outside of the assembly. A side 100 of the fuel channel 86 additionally is configured with a hole 102 which correspondingly mates with the hole 92 provided in the lower tie plate 88. The corresponding holes 92, 102 allow the hole 90 to extend between the fuel channel 86 and the lower tie plate 88. The head 104, as illustrated, is configured with a slot 106 to allow tightening of the bolt 90.

As illustrated in FIG. 7, the fuel channel lower end 108 is configured to fit into a lower tie plate slot 107. The depth of the lower tie plate slot 107 may be configured to not exceed the wall thickness of the lower tie plate 88 so that no provision to locally increase the wall thickness of the lower tie plate 88 is required. The bolt 90 may be inserted into the lower tie plate 88 until it contacts a contact surface 110 of the lower tie plate 88. The tie plate hole 92 provides an upper bearing surface 112 which provides a contact point between the lower tie plate 88 and the fuel channel lower end 108. The tie plate bearing surface 112 may be configured with stiffening elements and/or thicker material to prevent damage to the lower tie plate from occurring during lifting of the fuel assembly.

Figure 8:
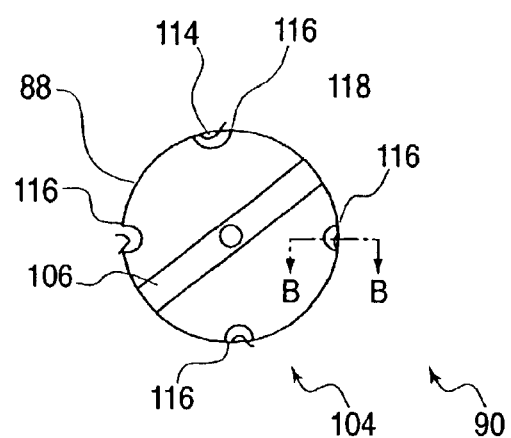
FIG. 8 is a detailed side view of the connecting bolt head of the connecting bolt arrangement of FIG. 6.

FIG. 8 is a cross-sectional view of the head 104 of the bolt 90 of FIGS. 6 and 7. The bolt 90 is maintained in position by material 104 deformed from the lower tie plate 88 which interact with sections 116 provided for material 104 capture. Deformation of the material 104 of the lower tie plate maybe accomplished through providing stress to the surface of the material located near the head 104 of the bolt 90. Alternatively, the lower tie plate 88 may be initially constructed with material 104 with the express purpose of deformation to allow retention of the bolt 90 within the hole 92. The bolt 90 may have alternate geometric configurations and therefore the round configuration presented is but one potential configuration. The bolt 90 materials selected may be chosen to minimize corrosion, therefore eliminating concerns regarding reactor water chemistry. The materials chosen for the bolt 90 may also provide a low neutron capture cross-section, thereby enabling fission to occur between fuel assemblies in an unimpeded manner. As an example embodiment, Inconel 750 or other high strength material compatible with nuclear fission environments may be used. The sections 116 provided in the head 104 of the bolt 90 may additionally be configured in other geometries, such as for example, rectangular, square or triangular shapes.

An opening 118 is formed in the body of the bolt 88. The opening 118 allows for remote handling of the bolt (for example, with a ball lock device). In an alternative configuration, the bolt 88 and the hole 102 may have matching threads, which may allow for easier installation of the bolt 88 into the lower tie plate 88. The treads, if used, may provide for additional stability during initial turning of the bolt 88. After initial radiation of the fuel assembly, the fuel channel 86 may be disengaged at the lower end by rotating the bolts 88 with an appropriate torque to overcome the resistance provided by the material 114. To reinstall the channel 86, at least two of the notches on the periphery of the bolt 88 are lined up with undisturbed material and the material is again deformed into the head 104, locking the bolt into place.

As illustrated in FIG. 6, four connecting bolts 88, one on each side of the lower tie plate may be used. The diameter of the bolts 88 may be varied, with an example diameter of 0.6 inches illustrated in the figures. The length of the bolt may also be varied with the length illustrated being approximately 0.4 inches. The positioning of the holes 102 and 92 in the respective fuel channel 86 and lower tie plate 88 may be performed such that only one possible combination of fuel channel 86 and lower tie plate 88 configuration may be provided.

Figure 9:
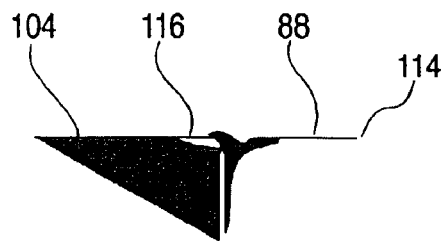
FIG. 9 is a cross-sectional view of the connecting bolt head of FIG. 6.

In FIG. 9, a cross-sectional view of the intersection between the bolt 88 and the lower tie plate 88 is illustrated. The lower tie plate material 114 is deformed to enter the sections 116 of the head 104. The deformation of the material 114 into the sections 116 may be accomplished such that the material 114 must be sheared in order axially remove the bolt when a removing torque is not applied to the head 104.

Figure 10:
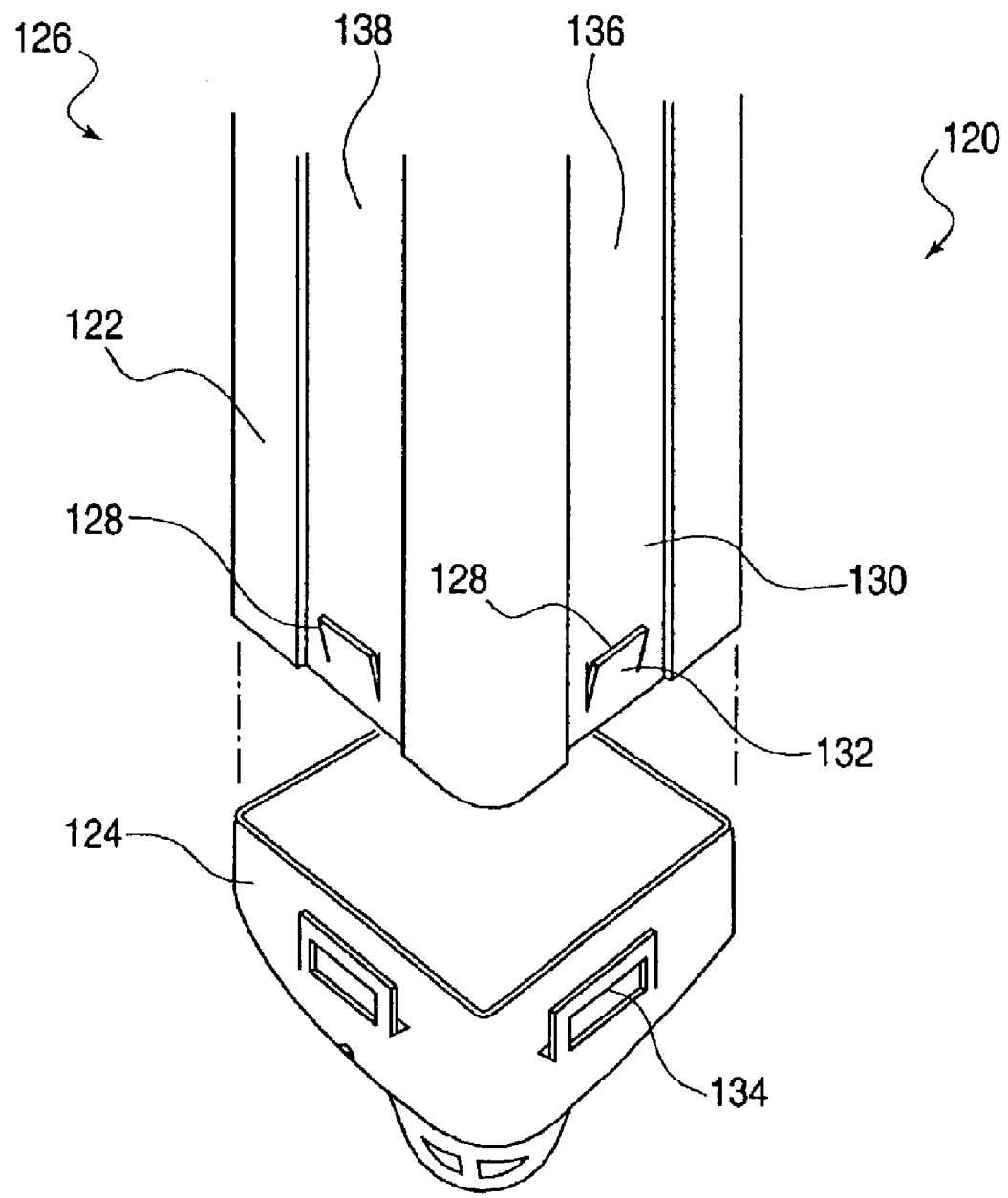
FIG. 10 is a perspective view of a fuel assembly with a capturing tab configuration in a separated position.

In FIG. 10 a fourth embodiment of a fuel channel 122 and lower tie plate 124 connection is illustrated. The fourth embodiment provides a connection type which uses a capturing tab configuration 120. The capturing tab configuration 120, illustrated in a separated configuration in FIG. 10, allows a fuel channel 122 to be connected to a lower tie plate 124 of a nuclear fuel assembly 126. The fuel channel 122 is configured with tabs 128 which are configured to extend towards an outside 130 of the fuel channel 122 from a connection point 132 of the tab 128. The amount of deflection of the tab 128 is chosen such that the tab 128 extends a sufficient amount to enable a grappling connection with a slot 134 positioned on the lower tie plate 124. The tab 128 and the slot 134 positions may be offset such that only one combination of the tab 128 and slot 134 will allow attachment of the fuel channel 122 to the lower tie plate 124. The tab 128 may be configured on a side portion 136 of the fuel channel 122 which is indented to limit fluid flow obstructions of the completed tab-slot configuration 120.

Interference is eliminated by elastically deforming the tab 128 and the tie plate 124 outer wall to allow installation and removal of the channel 122. The deformation of the tab 128 is designed such that both components remain in the elastic stress range for the materials. The configuration 120 does not interfere with the interference fittings between the lower tie plate 124 and the fuel channel 122 when combined. The slot 134 is configured to be sufficiently large enough to allow insertion of the tab 128 into the slot 134 without excessive play between the lower tie plate 124 and the fuel channel 122.

Deflection of the tab 128 is maintained at a level such that potential turbulence from fluid flow near the deflected tab 128 is minimized. Creation of the capturing tab configuration 120 may be performed as part of a new configuration or may be retrofitted to an existing fuel assembly.

Figure 11:
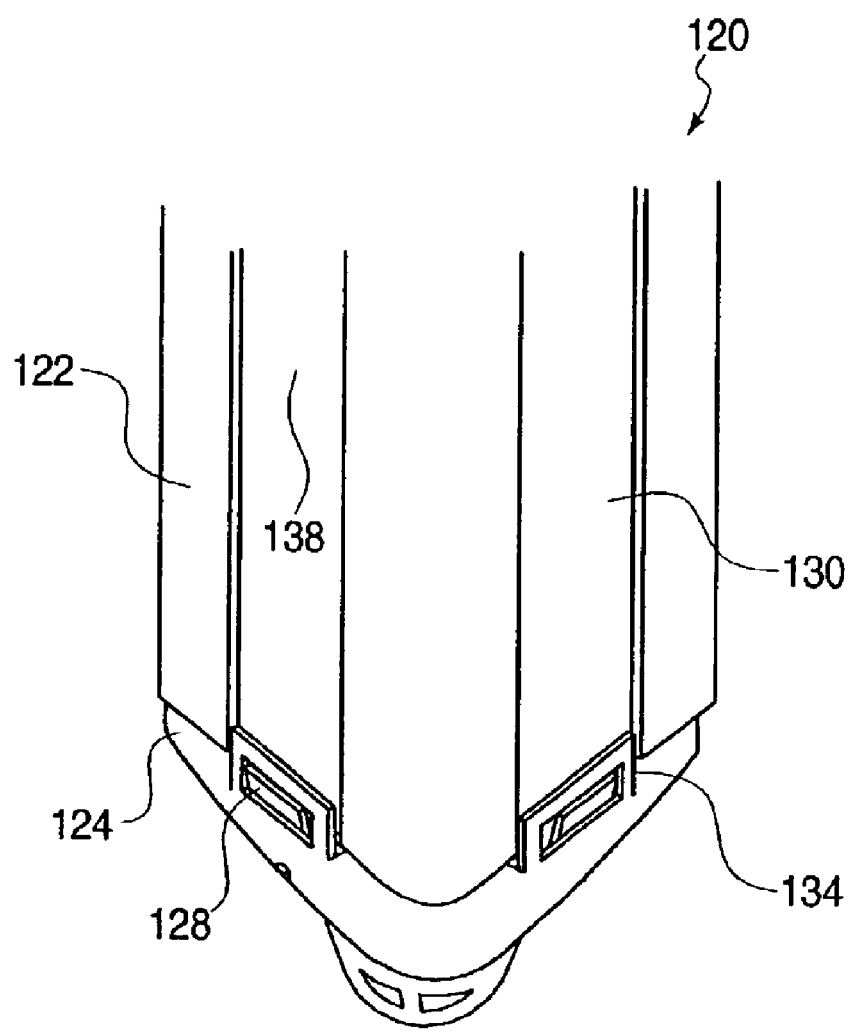
FIG. 11 is a perspective view of the fuel assembly of FIG. 10 with a capturing tab arrangement configuration in an assembled configuration.

FIG. 11 illustrates the capturing tab configuration 120 in an assembled configuration. In an assembled configuration, the capturing tab configuration 120 allows the fuel channel 122 to be mated to the lower tie plate 124 in a secure configuration, to provide, for example, a capability to lift the fuel assembly using the fuel channel 122 as the primary structural support during fuel assembly movement. The configuration also provides for disengagement of the lower end of the fuel channel 122 from the lower tie plate 124 so that the fuel channel 122 may be removed from the internals of the fuel assembly without need for lifting of the fissile material of the fuel rods.

Figure 12:
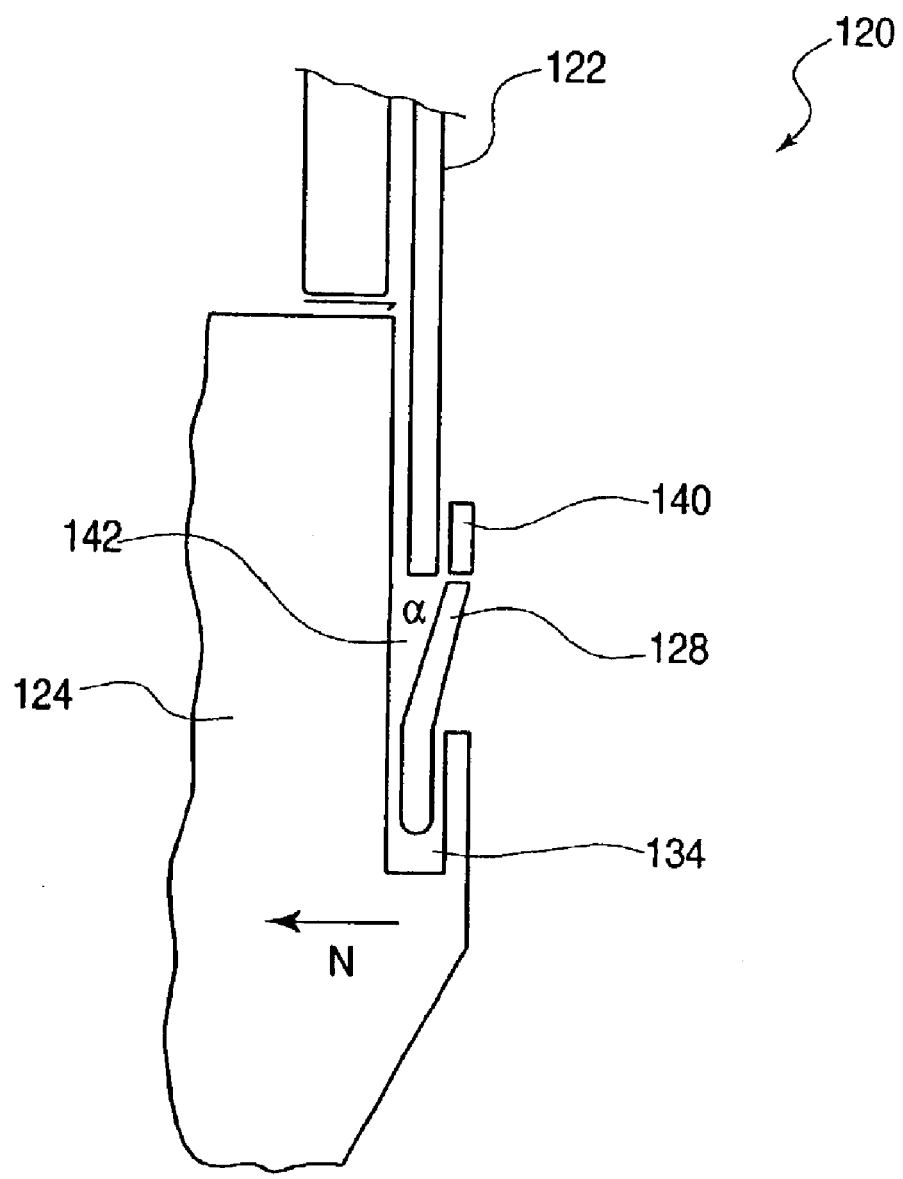
FIG. 12 is a side view of the fuel assembly with the capturing tab arrangement of FIG. 11.

Referring to FIG. 12, a cross-sectional view of the capturing tab configuration 120 is illustrated. As illustrated, the capturing tab configuration 120 provides a tab 128 which enters a slot 134 formed by the lower tie plate 124. The tab 128 bears on a bearing surface 140 preventing removal of the fuel channel 122 from the lower tie plate 124. The fuel channel 122 may be disengaged from the fuel assembly by depressing the tab 128 in the direction N thereby releasing friction between the tab 128 and the bearing surface 140. The length of the tab 128 and the angle α 142 may be selected such to provide a smooth transition between the tab 128 and the bearing surface 140. The materials for the tab 128, fuel channel 122 and the lower tie plate 124 may be selected to provide for high strength capability to allow for load transfer and required factors of safety for a load lift. The materials may additionally be corrosion resistant to prevent negatively affecting water chemistry of the coolant.

Figure 13:
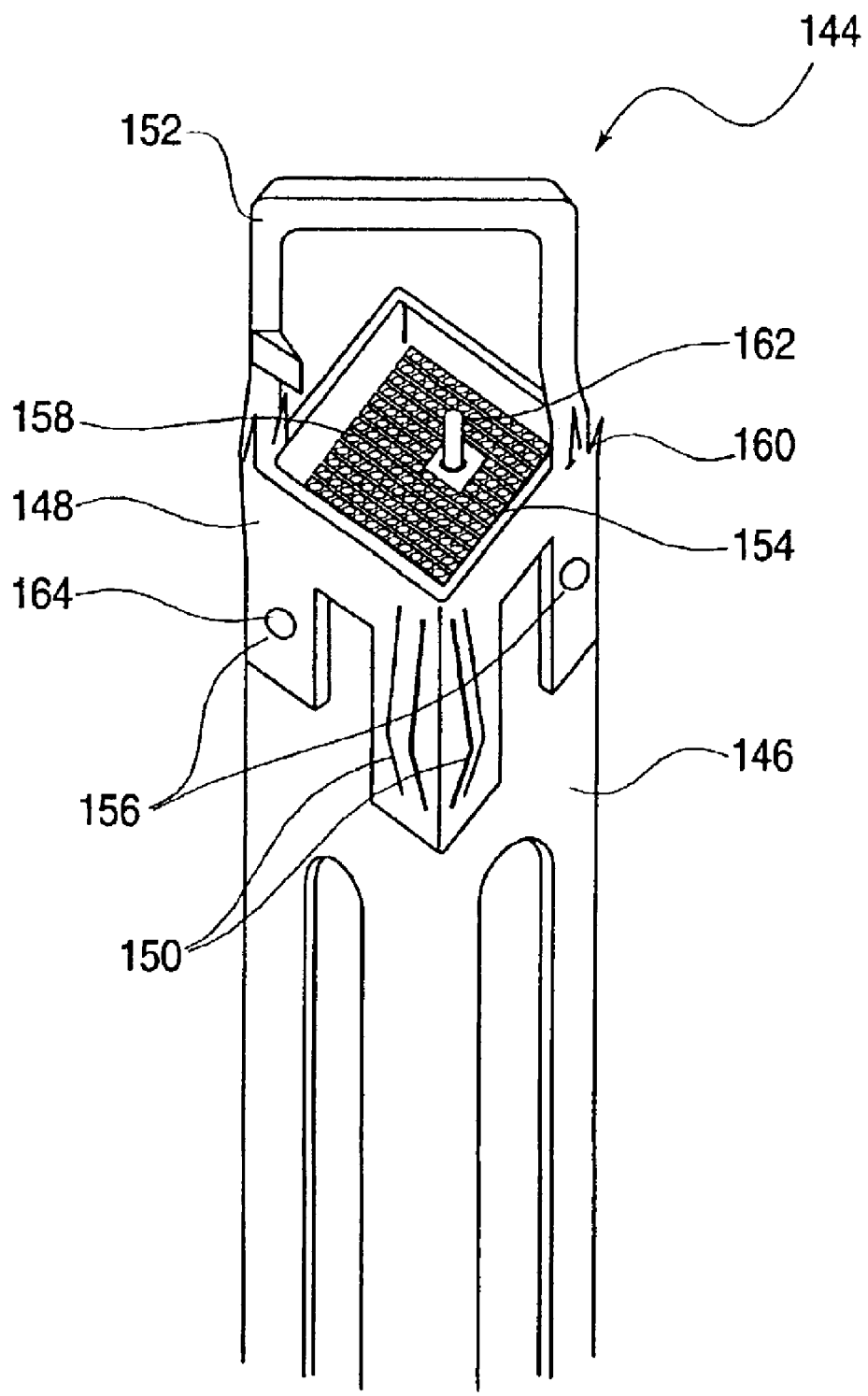
FIG. 13 is a perspective view of a fuel assembly upper portion with a streamlined spacer grid and channel spring arrangement.

In FIG. 13 an upper portion of a fuel assembly 144 is illustrated. The upper portion of the fuel assembly 144 provides a configuration which may be used in conjunction with the four previous lower end embodiments. The upper end 148 defines a volume which may be used, as an example, to house a streamlined spacer 154. A bail 152 is connected to the upper end 148. The bail 152 allows the fuel assembly 144 to be lifted with or without an attached fuel channel 146. The bail 152 is arranged such that the weight of the entire fuel assembly 144 may be lifted by a lifting device with desired factors of safety, ensuring a safe and complete lift. Although illustrated as a square ended bail, other configurations are possible including a rounded or oval shaped bail 152. The bail 152 is attached to a body 160 of the upper end 148. The attachment between the bail 152 and the body 160 may be through casting, welding or other connection mechanism allowing transfer of load. The bail 152 may be made of materials, such as stainless steel or Inconel 750 as examples, to provide sufficient structural rigidity for load transfer in the event of a lifting of the assembly 144. The materials may also be chosen such that they are corrosion resistant. The channel bail 152 may be attached to a fuel assembly grapple thus forming a load carrying structure for fuel assembly 144 movement.

Channel buttons 156 are positioned in the upper end 148 to allow for a connection between the upper end 148, the lower part of the fuel channel 146 and an interior spacer 154. The buttons 156 provide a mechanism by which the upper end 148 may be engaged to disengaged from the fuel channel 146. The buttons 156 may be configured to only release the lower end of the fuel channel 146, thereby permitting the body of the fuel channel 146 to be slipped off the fuel assembly 144 without requiring movement of the fissile materials in the fuel rods. The channel buttons 156 may be configured such that depression of the button 156 allows disengagement of the upper end of the fuel assembly 144. The buttons 156 may be configured with a spring in each button 156 to allow for retention of the button 156 in the hole 164 formed for the button 156 in the upper end 148.

Channel springs 150 are also configured in the upper end 148 of the fuel assembly 144. The channel springs 150 allow for retention of the upper end 148 to the lower end of the fuel channel 146. The springs 150 may be configured to deflect upon insertion of the upper end of the fuel channel 146 into the upper end 148. Release of the channel springs 150 thereby releases the lower end of the fuel channel 146, permitting disassembly of the fuel assembly 144.

Figure 14:
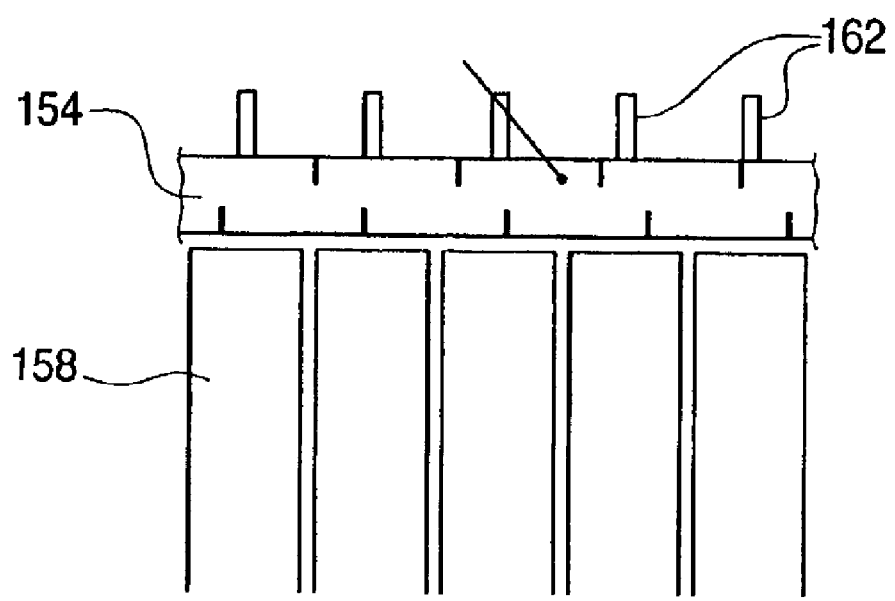
FIG. 14 is a side view of a fuel assembly upper portion with a streamlined spacer and channel spring arrangement of FIG. 13.

FIG. 14 illustrates a cross-sectional view of the interior placed streamlined spacer grid 154 of FIG. 13 which may be used with any of the embodiments. The streamlined spacer grid 154 is positioned between an upper end cap shoulder and the bail 152. A streamlined spacer grid 154 may be used to provide retention of the fuel rods 158 of the fuel assembly 144. The streamlined spacer grid 154 captures upper end caps 162 of the fuel rods 158. The streamlined spacer 154 provides lateral support to all of the end caps 162 of the fuel rods 158 and prevents upward movement of the fuel rods 158. The spacer 154 may be constructed from material which provides a low neutron capture cross-section, thereby allowing fission reactions to occur. In the example embodiment illustrated, the spacer 154 is made of flat stainless steel strips which are placed in perpendicular position thereby forming a grid. Other configurations are possible including configuring the spacer 154 from Inconel 750 or other similar material. The strips of the streamlined spacer 154 may be welded, such as by laser or electron beam welding, at each intersection of strip. Through the use of the streamlined spacer, the upper tie plate normally used in boiling water reactor fuel assemblies may be eliminated. The streamlined spacer 154 also allows for a longer effective fuel length due to the compact size of the spacer 154 in relation to upper tie plate designs of the other configurations.

The embodiments illustrated provide many benefits not present in other designs. Overall, the configurations of the present invention provide for an overall robustness of design, wherein the mechanical strength of the fuel assembly is superior to other configurations. The present invention also provides for better uranium utilization due to the increased fuel rod length, wherein longer fuel rods may be used or a greater plenum area may be designated. Other fuel assembly configurations use a "upper tie plate" which retains the fuel rods in a fixed position. These upper tie plates are difficult to manufacture and require complicated locking mechanisms for the fuel rods. The current invention resolves these concerns wherein the cumbersome locking devices for the fuel rods and the fuel channel are eliminated. Traditional spring clip assemblies used in other designs are also eliminated through the current invention. The streamlined spacer grid 154 provides an easier to manufacture configuration than upper tie plate configurations currently used. New fuel assemblies may be shipped with the channel on, which decreases cost to users of the fuel assembly by eliminating the need to perform channeling operations at the reactor site. New fuel assemblies incorporating the features presented also have greater structural protection during shipment wherein the fuel channel may protect the relatively fragile internal cladding elements of the fuel assembly.

The present invention also has a lower hydraulic resistance than other designs. This lower hydraulic resistance provides a more stable fuel assembly and an improved thermal performance. The present invention also eliminates the upper tie plate grid and the channel attachment post of other configurations, resulting in a fuel rod length that may be increased. In the example embodiments disclosed, fuel rod length may be increased up to two and a half inches through the use of the top streamlined spacer. This increased length may be used to either allow a larger plenum volume, wherein the plenum allows steam to gather in the upper reaches of the fuel assembly to increase heat transfer capability in the lower parts of the fuel assembly.

In the foregoing specification, the invention has been described with reference to specific exemplary embodiments, thereof. It will, however, be evident that various modifications and changes may be made thereunto without departing form the broader spirit and scope of the invention as set forth in the appended claims. The specification and drawings are accordingly to be regarded in an illustrative rather than a restrictive sense.

What is claimed is:

1. A nuclear fuel assembly for a boiling water reactor comprising:

a plurality of fuel elements;

a plurality of cladding elements configured around the plurality of fuel elements, each cladding element having a longitudinal axis, wherein the cladding elements have an upper end cap and a lower end thereby encapsulating the fuel elements, wherein each of the cladding elements is further configured along a common axial direction parallel to the individual longitudinal axes;

a plurality of spacer grids positioned between the upper end cap and the lower end of the cladding elements, the plurality of spacer grids configured to receive the plurality of cladding elements and to minimize movement of the plurality of cladding elements;

a fuel channel with an upper and a lower end and defining an interior volume, the fuel channel further configured to house the plurality of cladding elements and the plurality of spacer grids in the interior volume;

a lower tie plate configured to receive the fuel channel lower end, the lower tie plate configured to support the plurality of cladding elements at the lower end and transfer the weight of the lower tie plate and the plurality of cladding elements to the fuel channel through a tab configuration, the tab configuration configured to be positioned in an engaged configuration to allow load transfer from the lower tie plate to the fuel channel and a disengaged configuration, wherein the lower tie plate tab configuration has a vertically oriented slot to accept the fuel channel lower end and wherein the fuel channel lower end is inserted into the slot such that the lower tie plate tab configuration is external to the fuel channel lower end;

an upper end defining a volume and configured with a bail arranged to transfer a weight of the nuclear fuel assembly to a lifting device, the upper end arranged at the upper end of the fuel channel and connected to the upper end of the fuel channel through buttons, the buttons configured to release the fuel channel from the upper end to allow the fuel channel to be removed from the fuel assembly when the tab configuration is in the disengaged configuration, the fuel channel configured to be removed from the fuel assembly without requiring lifting of the plurality of cladding elements;

a streamlined spacer configured in the defined volume to retain the plurality of cladding elements and position the upper end caps of the plurality of cladding elements; and a nozzle configured as part of the lower tie plate, configured to receive and distribute a coolant moderator throughout the fuel assembly wherein the tab configuration is a capturing tab configuration and the fuel channel is configured with a plurality of tabs and the lower tie plate is configured with a plurality of slots, the plurality of tabs and plurality of slots matching in an engaged position to form the capturing tab configuration, the plurality of tabs entering the plurality of slots to allow weight transfer through the capturing tab configuration when lifting the nuclear fuel assembly.

2. The nuclear fuel assembly according to claim 1, wherein the plurality of tabs on the fuel channel do not extend further externally than the plurality of slots.

3. The nuclear fuel assembly according to claim 1, wherein the plurality of tabs and the plurality of slots are configured such that only one position is possible to engage the plurality of tabs and the plurality of slots when the fuel channel is received by the lower tie plate.

4. The nuclear fuel assembly according to claim 1, wherein the fuel channel is configured with indentations and the tab configuration comprises a plurality of tabs on the lower tie plate, the plurality of tabs configured to receive the indentations of the fuel channel in an engaged position to form a tab/channel connection.

5. The nuclear fuel assembly according to claim 4, wherein the fuel channel and the lower tie plate abut to provide a water-tight seal.

* * * * *